Figure 1:
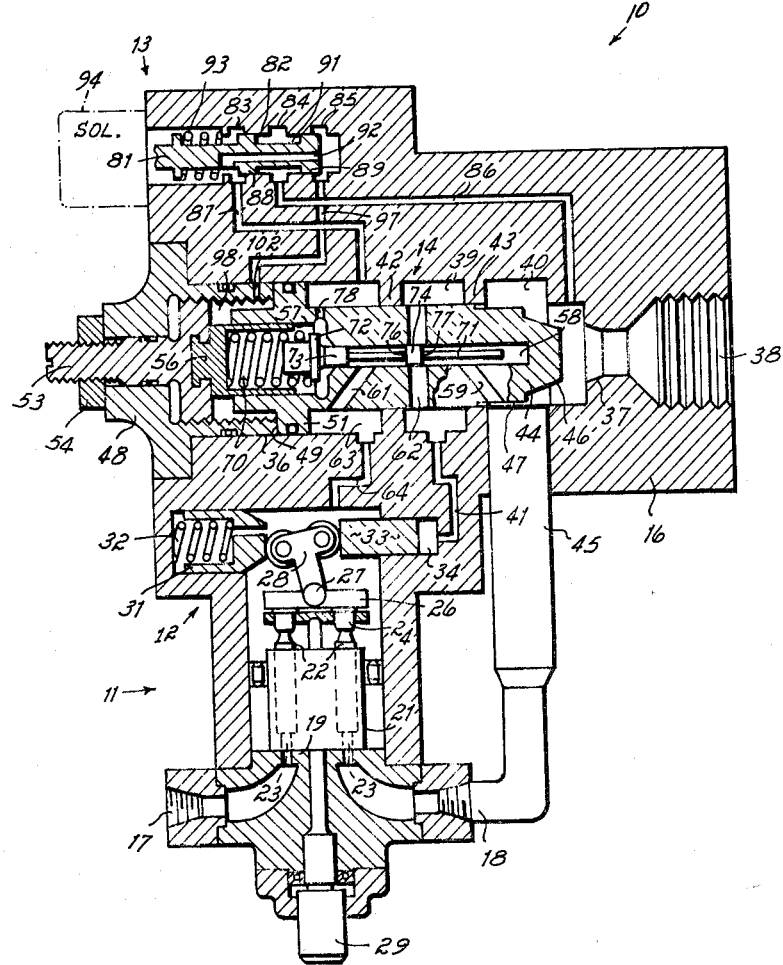

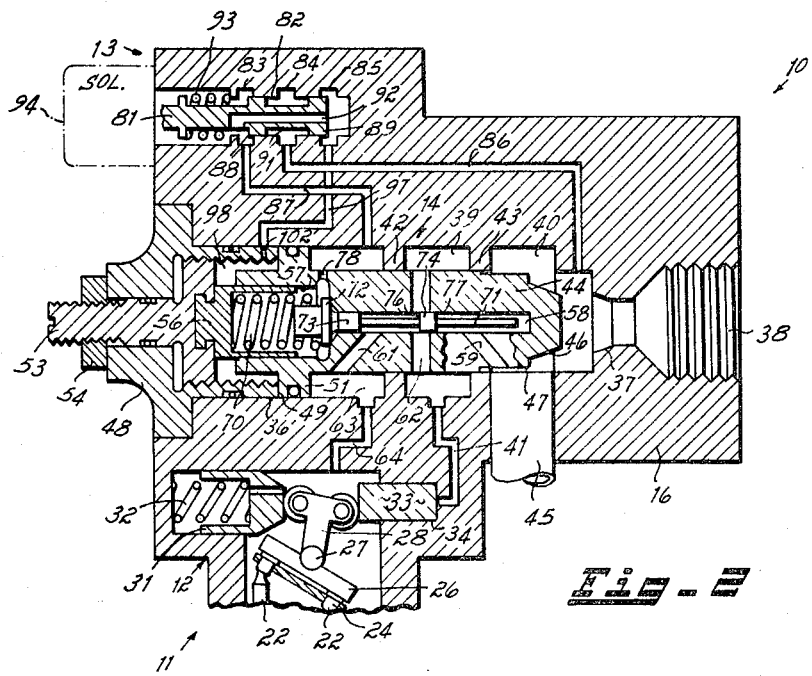

United States Patent Office 3,286,601
Patented Nov. 22, 1966

3,286,601
DEPRESSURIZING AND BLOCKING VALVE
MEANS FOR VARIABLE DISPLACEMENT
PUMP
Roger D. Jones, Camarillo, Calif., assignor to Abex
Corporation, a corporation of Delaware
Filed Jan. 18, 1965, Ser. No. 426,299
7 Claims. (Cl. 91—434)

This invention relates to improvements in pump blocking valves and depressurizers. Apparatus of the general type to which this invention relates functions upon actuation to close or block the pressure port of a variable volume pump while the pump is operating so that no pressure fluid is supplied to the hydraulic circuit in which the pump is connected, and simultaneously to reduce the pressure maintained internally by the pump while the blocking valve is closed.

In hydraulic systems to which fluid under pressure is supplied by two or more pumps it may be desirable for safety or other reasons to keep the several pumps operating and developing some pressure even when the volume of fluid then required by the system can be supplied by a single pump. Blocking valves are employed to isolate the pumps not being used to supply pressure fluid to the system so that those pumps may be operated at a reduced pressure which is less than system pressure, in order to save wear and tear. The pressure developed within a blocked pump may be just sufficient to maintain stress on its rotating elements, to minimize any internal slack or looseness that might otherwise appear. Opening the blocking valve immediately connects the pump back into the system, so that it can supply fluid under pressure to it without start up lag.

Such systems are frequently employed in multi-engine aircraft, for example, where hydraulic fluid under pressure for operating the various load devices of the aircraft can be supplied by a plurality of pumps. Under normal aircraft operating conditions the volume of fluid under pressure required for operating the load devices may be relatively small, within the capacity of one or more but less than all of the pumps of the system, while under other conditions, for example when maneuvering or in the event of damage to some part of the hydraulic system, all of the pumps may suddenly be called upon to deliver their full volumetric capacity at high pressure.

When the blocking valve is closed, the depressurizer actuates the volume changing means of the pump to reduce volumetric output to the minimum necessary to make up internal leakage and to maintain a predetermined reduced pressure; and when the blocking valve is open, the volume delivered by the pump to the system is controlled so that the pump will deliver only the volume required to maintain a desired pressure, which usually is higher than the internal pressure maintained when the blocking valve is closed.

For example, a pump with blocking and depressurizing means may be operated to supply, say, 3000 p.s.i. to the system into which it is connected when the blocking valve is open, and may be operated at, say, 500 p.s.i. when the blocking valve is closed. It is, of course, desirable that the pump deliver no greater output volume than required to maintain the predetermined pressure, whether the blocking valve is open or closed, for otherwise the pump would be working unnecessarily to pump a high volume of leakage or drain fluid.

It has been an objective of the inventor to provide simplified blocking valve and depressurizer means which are smaller in size and lighter in weight than previous devices of the same functional capabilities.

It has been another objective of the inventor to provide a blocking valve in which the blocking valve closes and opens in a manner preventing sudden changes in system pressure, so as to minimize the possibility of damage to the system caused by sharp, transient peak pressures resulting from abrupt valve opening or closure.

It has been a further objective to provide a blocking valve which will respond to a control signal very rapidly to open and close and to provide a depressurizer and pressure compensator which will respond rapidly to changes in the flow required by the system, even as the blocking valve is being opened or closed.

It has been another objective of the inventor to provide a blocking valve and depressurizer in which the depressurizing means are structurally combined with the blocking valve piston.

The invention can best be further described in relation to the drawings in which, FIGURE 1 is a cross section of a variable volume piston pump equipped with a blocking valve and depressurizer in accordance with a preferred embodiment of the invention, and shows the relation of the elements with the blocking valve open and the pump operating to deliver full pressure but at very low volumetric flow.

FIGURE 2 is a fragmentary view of the structure shown in FIGURE 1, and shows the relation of the elements with the blocking valve open and the pump delivering full pressure and full flow, corresponding to a demand by the hydraulic system for full volume of fluid under pressure; and FIGURE 3 is a view similar to FIGURE 2 but shows the relation of the elements with the blocking valve closed and the pump depressurized to operate at reduced internal pressure and delivering the minimal volume of flow necessary to maintain the reduced internal pressure.

The assembly designated generally by 10 includes a variable volume fluid pump of the piston type 11 having volume changing means 12, a control valve 13, and blocking valve and depressurizing means designated generally by 14. As shown, the elements 11 and 12, 13 and 14 are contained within a unitary body casting 16, although they may be housed and mounted as separate units if desired.

Pump 11 has an inlet or suction port 17, a pressure port 18 and an internal port plate 19. A rotatable cylinder barrel 21 contains a plurality of axially reciprocable pistons 22 which communicate sequentially through ports 23 with the inlet and pressure ports as the barrel is rotated. Pistons 22 have shoes 24 which engage and are held in contact with a pivoted swash or cam plate 26. Swash plate 26 is fastened rigidly to a hanger or yoke 28 and includes trunnions 27 which are pivoted for rotation. Movement imparted to hanger 28 to move it from left to right in FIGURE 1 swings swash plate 26 about its trunnions 27 to vary the volumetric capacity or displacement of the pump per revolution of the barrel. When rotational movement is imparted to barrel 21 through a shaft 29 driven by prime mover (not shown) and swash plate 26 is tilted with respect to a plane perpendicular to shaft 29, the pistons are caused to reciprocate in their bores, receiving fluid through the port plate 19 from inlet 17 and displacing it positively through pressure port 18. It will be recognized that the pump 11 shown for purposes of explanation is of the conventional variable volume single side piston type, and that other types of pumps such as variable volume vane pumps, etc., which include fluid pressure operated volume changing means could be used alternatively.

In FIGURE 1 the swash plate 26 is illustrated in its neutral or center position in which the pistons 22 have a stroke which is substantially zero when the barrel is rotated. In this attitude only a very small volume of fluid is delivered to pressure port 18. The hanger 28 is actuated to establish a larger flow by a rate piston 31 slidably mounted in a bore in body 16, and this piston 31 is biased to urge hanger 28 toward full volume position by a spring 32. A stroking piston 33 slidably mounted in a bore 34 engages the opposite side of hanger 28 and is operated by fluid pressure in bore 34 to oppose rate piston 31.

A bore 36 is formed in body 16 and communicates at its inner end through a blocking valve seat 37 with a pressure outlet port or system pressure port 38. Port 38 is adapted to be connected into a hydraulic circuit to which fluid under pressure is supplied by pump 11 when the blocking valve is open. Port 38 is isolated from the pump when the blocking valve is closed, as will be described. Lands 42 and 43 are formed in bore 36 and define a circumferential groove 39 between them which communicates with bore 34 through a line 41. Another groove 40 is formed between land 43 and seat 37, and this groove 40 communicates with the pump pressure port 18 by a pressure inlet port or line 45.

A blocking valve piston designated generally by 44 is reciprocable in bore 36 and has a conically tapered inner end surface 46 adapted to form a closure with valve seat 37 to block flow of fluid from pump port 18 to the system pressure port 38 when the valve 37, 46 is closed (see FIG. 3). The circumference of blocking valve piston 44 is slightly relieved at its inner end as at 47. This relieved surface 47 cooperates with the reduced diameter inner end of bore 36 as piston 44 approaches seat 37 to define a narrow flow restricting annular passageway 100, as shown in FIG. 3. Bore 36 is closed at its outer end by a sealed insert or plug 48, the inner end of which forms a stop 49 which limits opening movement of the piston 44 by engaging a shoulder 51 formed on the piston.

A pressure adjustment member 53 can be positioned axially in plug 48 and locked thereto by a lock nut 54. A spring seat 56 is carried at the inner end of member 53. Blocking piston 44 is recessed axially as at 57, and the spring seat 56 extends slidably into this recess 57.

Piston 44 has a smaller diameter bore 58 extending axially inwardly from recess or bore 57. Bore 58 is intersected by diagonal bores 59 and 61 and by a radial cross bore 62. Bore 59 communicates constantly with groove 40, and bore 61 communicates constantly with a chamber 63 defined in bore 36 between piston shoulder 51 and land 42. Chamber 63 communicates with the pump casing and a fluid drain through a line 64, and with recess or bore 57 by a flow restrictor 78. Radial bore 62 constantly communicates with groove 39.

A depressurizer or pressure compensator spool 71 is slidably sealed in bore 58 of the blocking piston. A flange 72 at the outer end of spool 71 is engaged by a spring 70 in spring seat 56 which urges spool 71 to the right. Spool 71 has two axially spaced lands 73 and 74, and the opposite faces 76 and 77 of land 74 form valves with the opposite sides of radial bore 62, as will be explained. Flange 72 limits movement to the right of spool 71 in bore 58.

Control valve 13 includes a movable valve member or spool 81 which is slidable in a bore 82. Bore 82 is provided with three axially spaced internal grooves 83, 84 and 85. Groove 84 is connected through a line 86 with the inner end of bore 36, between groove 40 and seat 37, while groove 83 is connected to chamber 63 through line 87.

Spool 82 has a pair of lands 88 and 89 spaced by a groove 91. An axial bore 92 extends from the inner end of spool 81 to groove 83, and a spring 93 urges spool 81 toward the position shown in FIGS. 1 and 2. Spool 81 is positioned axially in its bore 82 by control means such as an electric solenoid indicated diagrammatically at 94. In FIGURES 1 and 2 spool 81 is shown in the position it occupies when solenoid 94 is de-energized. When solenoid 94 is energized spool 81 is moved to the right against spring 93 to the position shown in FIGURE 3, wherein grooves 84 and 85 communicate through spool groove 91. A line 97 connects groove 85 through a flow restrictor 102 with a chamber 98 around spring seat 56 in bore 36.

Actuation of the solenoid control means 94 controls opening and closing of the port blocking valve 37, 46. With the solenoid de-energized, as shown in FIGS. 1 and 2, pressure from port 18 applied to groove 84 of control valve 13 by line 86 is blocked therein by the lands 88 and 89 of spool 81. Chamber 98 is connected to tank or the pump casing through line 97, bore 92 in piston 81, and lines 87 and 64. Pressure fluid from line 45 is applied through diagonal bore 59 and acts upon the right face 77 of land 74. Bore 57 under these circumstances is connected to tank through orifice 78.

If the fluid force acting on the right face 77 of land 74 exceeds the force of spring 70, spool 71 is moved to the left, as shown in FIG. 1, opening the valve 62, 77 and putting the stroking piston bore 34 in communication with port 18 through line 41. Pressure is therefore applied to the stroking piston 33, holding hanger 28 in the position corresponding to minimum flow, against the force of spring 32. The pressure maintained by the pump is controlled by the setting of adjustment member 53, and the pump delivers only the volume of fluid necessary to make up system losses of fluid at that pressure. No substantial volume of fluid is being called for by the system into which the pump is connected.

If the hydraulic circuit calls upon the pump to deliver a larger volume of fluid, this is first manifested by a drop in the system pressure at port 38. The reduced pressure is reflected through bore 59 against face 77 of land 74. If this reuced pressure is less than the pressure required to hold valve 62, 77 open, spring 70 will move the spool 71 to the right so that valve 62, 77 is closed and valve 62, 76 opens. Stroking piston bore 34 is thereby connected to tank and fluid in bore 34 is displaced as piston 33 is moved back by the force of spring 32 which is transmitted to it through rate piston 31 and hanger 28. The volume control means 12 are moved to a position corresponding to greater output volume, and the apparatus remains substantially in this attitude so long as the system output pressure is insufficient to overcome the force of spring 70 and valve 62, 76 remains open. When system pressure is restored to the value determined by the setting of member 53, spool 71 is moved against spring 70. Valve 62, 76 is thereby closed and valve 62, 77 is opened, so that fluid under pressure is applied to bore 34 to reduce the volume of fluid delivered by the pump to the flow necessary to maintain pressure.

Blocking valve 46 is closed by energizing solenoid 94. The solenoid then moves spool 81 to the right, thereby establishing communication between grooves 84 and 85. Fluid under pressure then flows from groove 84 to groove 85 and through line 97 to chamber 98. Pressure is applied to piston 44 over an annular area around spring seat 56 and this pressure moves the piston toward seat 37. As piston surface 46 approaches seat 37, the relieved surface 47 cooperates with the side of groove 40 to form a restricted annular orifice at 100, as shown in FIGURE 3; similarly, piston head 46 forms a diminishing annular orifice with seat 37 restricting the flow of fluid therethrough into line 86. The rate of flow of fluid into chamber 98 is therefore restricted as the valve approaches closure, and this establishes a cushioning effect preventing overly rapid closure of the valve 46, 37 and consequent damage to the system and/or valve. Provision of this flow restrictor between the piston and body affords the advantageous result that particles of dirt in the orifice 100 are washed out when piston moves away from seat 37 as the blocking valve is opened.

The pressure of fluid in line or port 45 is constantly applied through diagonal bore 59 and acts on face 77 of land 76. As piston 44 moves toward closed position, the force which spring 70 can exert to close valve 62, 77 diminishes, because bore 62 is spaced increasingly farther from spring seat 56. Therefore, valve 62, 77 will open at lower pressures on land 77 when the blocking valve is closed or closing than when the blocking valve is open. As valve 62, 77 is opened fluid under pressure is applied to piston 33 to move the volume changing means 12 of the pump toward a position corresponding to smaller volumetric output. This occurs as the blocking valve is closing, even before it has closed. Under these circumstances the pump will deliver only the volume of fluid necessary to make up internal leakage and to maintain the pressure sufficiently high to keep valve 62, 77 cracked open at the depressurized pressure. The setting of member 53 and the travel of piston 44 are factors which control the reduced pressure maintained when the blocking valve is closed.

The blocking valve is opened by de-energizing solenoid 94, which causes chamber 98 to be connected to tank. Displacement of fluid from chamber 98 in response to pressure on the end of piston 44 in port 37 is limited by the rate at which fluid can escape through the restricted orifice 102, preventing overly rapid opening movement of the piston.

While I have described a preferred embodiment of my invention, those skilled in the art will recognize that the principles of the invention can be incorporated in other modifications and variations within the scope of the following claims.

I claim:
1. Depressurizing and blocking valve means for a variable displacement pump of the type having a fluid motor for changing the displacement thereof, comprising,
   a body having a pressure inlet and a pressure outlet,
   a piston cooperable with a valve seat between said inlet and outlet to form a valve,
   means for applying pressure fluid from said inlet to said piston to move said piston toward said seat and close said valve, said means including a selectively operable control valve and a flow restricting passage defined by and between said piston and body when said piston approaches said seat,
   first passage means for applying pressure fluid from said inlet to said fluid motor including a portion within said piston, a spool movable in the portion of said first passage means within said piston and presenting a first transverse surface forming a first valve with said piston in said passage means for controlling the application of fluid therethrough to said motor, said first transverse surface being acted upon at all times by pressure fluid in said passage means from said inlet,
   second passage means for releasing fluid from said motor including a portion within said piston, said spool also presenting a second transverse surface forming a second valve with said piston in said second passage means for controlling the release of fluid therethrough from said motor,
   a spring having one end fixed with respect to said body and urging said spool in a direction against the force of said pressure fluid on said first transverse surface and tending to close said first valve and open said second valve, the force applied by said spring to said spool being independent of the position of said piston but the pressure required to open said first valve diminishing as said piston approaches said seat,
   and means for adjusting the force of said spring.

2. Depressurizing and blocking valve means for a variable displacement pump of the type having a fluid motor for changing the displacement thereof, comprising,
   a body having a pressure inlet and a pressure outlet,
   a piston cooperable with a valve seat between said inlet and outlet to form a blocking valve,
   means for applying pressure fluid from said inlet to said piston to move said piston toward said seat and close said valve, said means including a selectively operable control valve and a flow restricting passage defined by and between said piston and body when said piston approaches said seat,
   means for releasing fluid tending to hold said blocking valve closed to permit said piston to move away from said seat in response to an opposed pressure thereon, said means including a flow restricting passage restricting the release of said fluid,
   first passage means for applying pressure fluid from said inlet to said fluid motor including a portion within said piston, a spool movable in the portion of said first passage means within said piston and presenting a first transverse surface forming a first valve with said piston in said passage means for controlling the application of fluid therethrough to said motor, said first transverse surface being acted upon at all times by pressure fluid in said passage means from said inlet,
   second passage means for releasing fluid from said motor including a portion within said piston, said spool also presenting a second transverse surface forming a second valve with said piston in said second passage means for controlling the release of fluid therethrough from said motor, said second transverse surface being opposite to said first transverse surface,
   a spring having one end fixed with respect to said body, said spring urging said spool against the force of said pressure fluid on said first transverse surface and thereby tending to close said first valve and open said second valve, the force applied by said spring to said spool being independent of the position of said piston but the pressure required to open said first valve diminishing as said piston approaches said seat,
   and means for adjusting the force of said spring.

3. Depressurizing and blocking valve means for a variable displacement pump of the type having a pressure operated movable displacement control element for changing the displacement of said pump, comprising:
   a body having a pressure inlet and a pressure outlet,
   a piston cooperable with a valve seat between said inlet and outlet to form a blocking valve, means for selectively opening and closing said blocking valve,
   an axial bore in said piston, a cross bore entering said axial bore and constantly communicating with said displacement control element, first passage means connected to said axial bore on one side of said cross bore and constantly communicating with said inlet, second passage means connected to said axial bore on the opposite side of said cross bore and constantly communicating with a fluid tank,
   a spool slidable in said axial bore of said piston, said spool having a land thereon between said first and second passage means, one transverse face of said land forming a first valve with said cross bore controlling the application of pressure fluid from inlet to said displacement control element, said pressure fluid constantly acting against said face of said land and tending to open said first valve, an opposite transverse face of said land forming a second valve with said cross bore controlling the release of fluid from said displacement control element to said tank,
   and a spring having one end fixed with respect to said body and at its other end urging said spool in a direction tending to close said first valve against the force of pressure fluid acting on the said one transverse face of said land.

4. Depressurizing and blocking valve means for a variable displacement pump of the type having a pressure operated movable displacement control element for changing the displacement of said pump, comprising,
   a body having a pressure inlet and a pressure outlet, a piston cooperable with a valve seat between said inlet and outlet to form a blocking valve, means for selectively opening and closing said blocking valve, an axial bore in said piston, a port intersecting said axial bore and constantly communicating with said displacement control element, first passage means entering said axial bore on one side of said port and constantly communicating with said inlet, second passage means entering said axial bore on the opposite side of said port and constantly communicating with a fluid tank, a valve element in said axial bore of said piston between said first and second passage means, said valve element being movable in said axial bore across said port and presenting a first surface forming a first valve with said port controlling the application of pressure fluid from said inlet to said displacement control element, said pressure fluid constantly acting against said first surface of said valve element and tending to open said first valve, said valve element presenting a second surface forming a second valve with said port controlling the release of fluid from said displacement control element to said tank, and a spring having one end fixed with respect to said body and at its other end urging said valve element in a direction tending to close said first valve against the force of pressure fluid acting on the said first surface.

5. Depressurizing and blocking valve means for a variable displacement pump of the type having a pressure operated movable displacement control element for changing the displacement of said pump, comprising, a body having a pressure inlet and a pressure outlet, a piston cooperable with a valve seat between said inlet and outlet to form a blocking valve, means for selectively opening and closing said blocking valve, an axial bore in said piston, a port intersecting said axial bore and constantly communicating with said displacement control element, first passage means entering said axial bore on one side of said port and constantly communicating with said inlet, second passage means entering said axial bore on the opposite side of said port and constantly communicating with a fluid tank.

a valve element in said axial bore of said piston between said first and second passage means, said valve element being movable in said axial bore across said port and presenting a first surface forming a first valve with said port controlling the application of pressure fluid from said inlet to said displacement control element, said pressure fluid constantly acting against said first surface of said valve element and tending to open said first valve, said valve element presenting a second surface forming a second valve with said port controlling the release of fluid from said displacement control element to said tank, and elastic means tending to move said valve element against said pressure fluid acting on said first surface to close said first valve, the force supplied by said elastic means to said valve element in closing said first valve diminishing as said piston approaches said seat.

6. Depressurizing and blocking valve means for a variable displacement pump of the type having a pressure operated movable displacement control element for changing the displacement of said pump comprising, a body having a pressure inlet and a pressure outlet, a piston cooperable with a valve seat between said inlet and outlet to form a blocking valve, means for selectively opening and closing said blocking valve, a passage for applying pressure fluid from said inlet to said displacement control element, said passage including a passage portion within said piston, a valve element movable in said passage portion within said piston and forming a depressurizer valve with said piston controlling the application of pressure fluid through said passage portion to said displacement control element, pressure fluid from said inlet constantly acting on said valve element and tending to open said depressurizer valve, spring means external to said piston acting on said valve element and tending to close said depressurizer valve with a force which diminishes as said piston approaches said seat, and valve means for releasing fluid from said displacement control element when said depressurizer valve is closed.

7. Depressurizing and blocking valve means for a variable displacement pump of the type having a pressure operated movable displacement control element for changing the displacement of said pump, comprising, a body having a pressure inlet and a pressure outlet, a piston cooperable with a valve seat between said inlet and outlet to form a blocking valve, a passage between said inlet and an endwise surface of said piston opposite from said port for applying pressure to said surface to close said blocking valve, said passage including a selectively operable control valve and a portion defined between said piston and said body the area of which is reduced to restrict flow when said piston approaches said port, passage means for applying pressure to and releasing fluid from said displacement control member including a bore within said piston, a movable valve element in said bore forming a first valve with said piston controlling the application of pressure to said displacement control and a second valve with said piston controlling the release of fluid from said displacement control, a spring having one end fixed wtih respect to said body and the other end engaging said valve member, said spring tending to move said valve element in a direction closing said first valve and opening said second valve, means applying pressure fluid from said inlet to said valve element tending to open said first valve and close said second valve, the pressure required to open said first valve and close said second valve diminishing as said piston approaches said seat.

References Cited by the Examiner
UNITED STATES PATENTS

| | | | |
|---|---|---|---|
| 1,003,163 | 9/1911 | Turner | 91—433 |
| 2,223,838 | 12/1940 | Tweedale | 91—199 |
| 2,882,863 | 4/1959 | Newton | 91—433 |
| 3,093,946 | 6/1963 | Pitt et al. | 91—433 |
| 3,139,006 | 6/1964 | Budzich | 91—199 |

MARTIN P. SCHWADRON, *Primary Examiner.*

P. E. MASLOUSKY, *Assistant Examiner.*